(12) United States Patent
Lee et al.

(10) Patent No.: US 12,136,845 B2
(45) Date of Patent: Nov. 5, 2024

(54) MULTI-CHARGING APPARATUS AND METHOD FOR CONTROLLING CURRENT OF MOTOR UPON FAILURE OF SENSOR

(71) Applicants: HYUNDAI MOTOR COMPANY, Seoul (KR); KIA MOTORS CORPORATION, Seoul (KR)

(72) Inventors: Sang-Kyu Lee, Yongin-si (KR); Hyun-Woo Noh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 754 days.

(21) Appl. No.: 17/172,962

(22) Filed: Feb. 10, 2021

(65) Prior Publication Data

US 2022/0109320 A1 Apr. 7, 2022

(30) Foreign Application Priority Data

Oct. 5, 2020 (KR) .................. 10-2020-0128251

(51) Int. Cl.
*H02J 7/14* (2006.01)
*H02J 7/00* (2006.01)
(52) U.S. Cl.
CPC ........ *H02J 7/1469* (2013.01); *H02J 7/00714* (2020.01)

(58) Field of Classification Search
CPC ...................................... H02J 7/1469
USPC ........................................... 320/162
See application file for complete search history.

(56) References Cited

U.S. PATENT DOCUMENTS

| 9,381,878 B2 | 7/2016 | Ichikawa | |
|---|---|---|---|
| 10,203,363 B2 | 2/2019 | Premerlani et al. | |
| 2014/0077760 A1 | 3/2014 | Ichikawa | |
| 2015/0015190 A1* | 1/2015 | Tischer | H02J 7/00 320/152 |
| 2017/0264122 A1* | 9/2017 | Greening | H02J 7/00 |
| 2018/0164362 A1 | 6/2018 | Premerlani et al. | |
| 2020/0280190 A1* | 9/2020 | Lehn | B60L 53/122 |
| 2020/0295660 A1* | 9/2020 | Oguma | H02J 7/342 |

FOREIGN PATENT DOCUMENTS

| CN | 103561994 A | 2/2014 |
|---|---|---|
| CN | 110100184 A | 8/2019 |
| KR | 20150053062 | 5/2015 |

\* cited by examiner

*Primary Examiner* — Yalkew Fantu
(74) *Attorney, Agent, or Firm* — Fox Rothschild LLP

(57) ABSTRACT

A multi-charging apparatus includes a power converter, a first sensing unit configured to sense a power source introduced into the power converter from a motor or introduced into the motor from the power converter, and a controller configured to determine whether failure occurs in the first sensing unit, and execute a charging operation control for the power converter when a failure occurs.

16 Claims, 4 Drawing Sheets

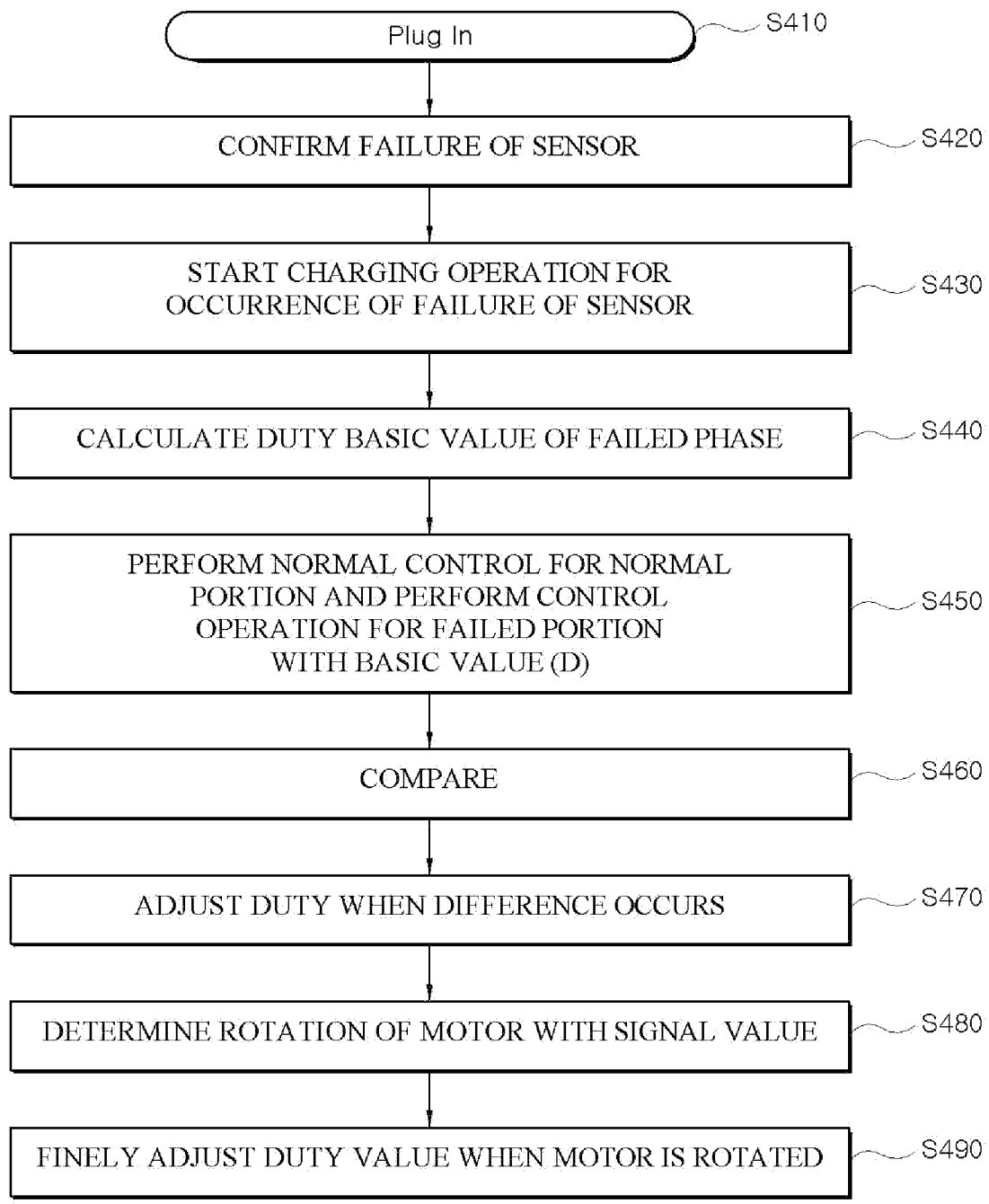

MULTI-CHARGING APPARATUS AND METHOD FOR CONTROLLING CURRENT OF MOTOR UPON FAILURE OF SENSOR

CROSS-REFERENCE TO RELATED APPLICATION

The present application claims priority to and the benefit of Korean Patent Application No. 10-2020-0128251, filed on Oct. 5, 2020, which is incorporated herein by reference in its entirety.

TECHNICAL FIELD

The present disclosure relates to a high-voltage battery charging technology.

BACKGROUND

A multi-charging system is a system capable of charging in all of a 400 V-level charger and an 800 V-level charger. The 800 V-level charger may additionally use a boost converter, but operates like the boost converter when utilizing the conventional motor-inverter. Therefore, the 800 V-level charger increases about 400 V to about 800 V utilizing the conventional motor-inverter.

The multi-charging system utilizing the motor-inverter is operated by using a three-phase coil of a motor, six switches of an inverter, and three current sensors. That is, a voltage of 400 V supplied from electric vehicle supply equipment (EVSE) is increased to 800 V through the motor and the inverter serving as an inductor to be charged in a battery. That is, if the EVSE exclusively supplies only 400 V, it is difficult to charge the battery for an electric vehicle in which a battery is required to be charged to 800 V. Therefore, the multi-charging system solves such a situation.

However, in the case of the multi-charging system utilizing the motor-inverter, a current sensor is disposed for each phase of the motor to monitor a current introduced into the motor or generated by the motor. When failure occurs in only one of three current sensors, the charging is not possible. Further, when the charging is made by two phases of three phases of the motor due to the failure of the current sensor, the balance of the force in the motor is broken, such that the vehicle moves during charging, thereby causing the dangerous situation.

Since a motor control for operating the vehicle requires only two current sensors, there is no problem in traveling even if the failure occurs in the current sensor. However, since the charging is not made, the vehicle user may not eventually move to the desired place.

Therefore, there is a need for a technology capable of all of the traveling and the charging even in the state where the failure occurs in the current sensor.

The contents described here are to help the understanding of the background of the present disclosure, and may include what is not previously known to those skilled in the art to which the present disclosure pertains.

SUMMARY

The present disclosure provides a multi-charging apparatus and method capable of performing charging by inhibiting the rotation of a motor even if failure occurs in some sensors.

Further, the present disclosure also provides a multi-charging apparatus and method capable of a charging operation even if one of three sensors is removed by increasing control precision.

To achieve the objects, the present disclosure provides a multi-charging apparatus capable of performing charging by inhibiting the rotation of a motor even if failure occurs in some sensors.

The multi-charging apparatus is characterized by including:

a power converter for converting a first voltage power source introduced into a motor into a second voltage power source larger than the first voltage power source to supply the second voltage power source to a battery;

a first sensing unit provided on each of three phases of the motor to sense each power source for the first voltage power source; and a controller for determining whether the first sensing unit is failed, and executing a charging operation control for the power converter to control a current value of a failed phase based on a current value of a normal phase of three phases when failure occurs according to the determination result.

Further, the controller is characterized by determining whether failure occurs by comparing an output value of the first sensing unit with a preset reference value.

Unlike the above, the controller is characterized by determining whether failure occurs through whether the ON/OFF timing points of at least one power switching element disposed on the power converter coincide with the change timing point of the output value of the first sensing unit.

Further, the charging operation control is characterized by being composed of a first control performing a control with a default value calculated based on the failed phase and a second control performing a normal control based on the normal phase.

Further, the default value is characterized by being calculated by using a control duty value of the failed phase in which failure occurs.

Further, the control duty value is characterized by being calculated by dividing a difference value between a battery power source value and an external charger power source value by the battery power source value.

Further, the control duty value is characterized by being subject to a first adjustment when the output value of the failed phase and the output value of the normal phase are not equal to each other.

Further, the first adjustment is characterized by decreasing the control duty value when the output value of the failed phase is larger than the output value of the normal phase, and increasing the control duty value when the output value of the failed phase is smaller than the output value of the normal phase.

Further, the control duty value is characterized by being subject to a second adjustment according to whether the motor is rotated by the sensing of the second sensing unit, when the output value of the failed phase and the output value of the normal phase are equal to each other.

Further, the second adjustment is characterized by decreasing the control duty value when a location value of the second sensing unit, which is moved as the motor rotates, is larger than a current value at which the second sensing unit is located before charging starts, and increasing the control duty value when the location value of the second sensing unit is smaller than the current value, in order to prevent the rotation of the motor.

On the other hand, another exemplary embodiment of the present disclosure provides a multi-charging method including: sensing, by a first sensing unit provided on each of three phases of a motor, each power source for a first voltage introduced from the motor; determining, by a controller, whether failure occurs in the first sensing unit; executing, by the controller, a charging operation control controlling a current value of a failed phase based on a current value of a normal phase of three phases when failure occurs according to the determination result; and charging, by a power converter, which converts a first voltage power source into a second voltage power source larger than the first voltage power source to supply the second voltage power source to a battery.

The present disclosure may perform charging by preventing the rotation of the motor even if the failure occurs in some sensors.

Further, the present disclosure may ultimately remove one of current three sensors when the precision of the control is increased.

Further, the present disclosure may also save the design cost by removing some components.

DRAWINGS

FIG. 4 is a flowchart illustrating a multi-charging control process in one form of the present disclosure.

DETAILED DESCRIPTION

Figure 1:
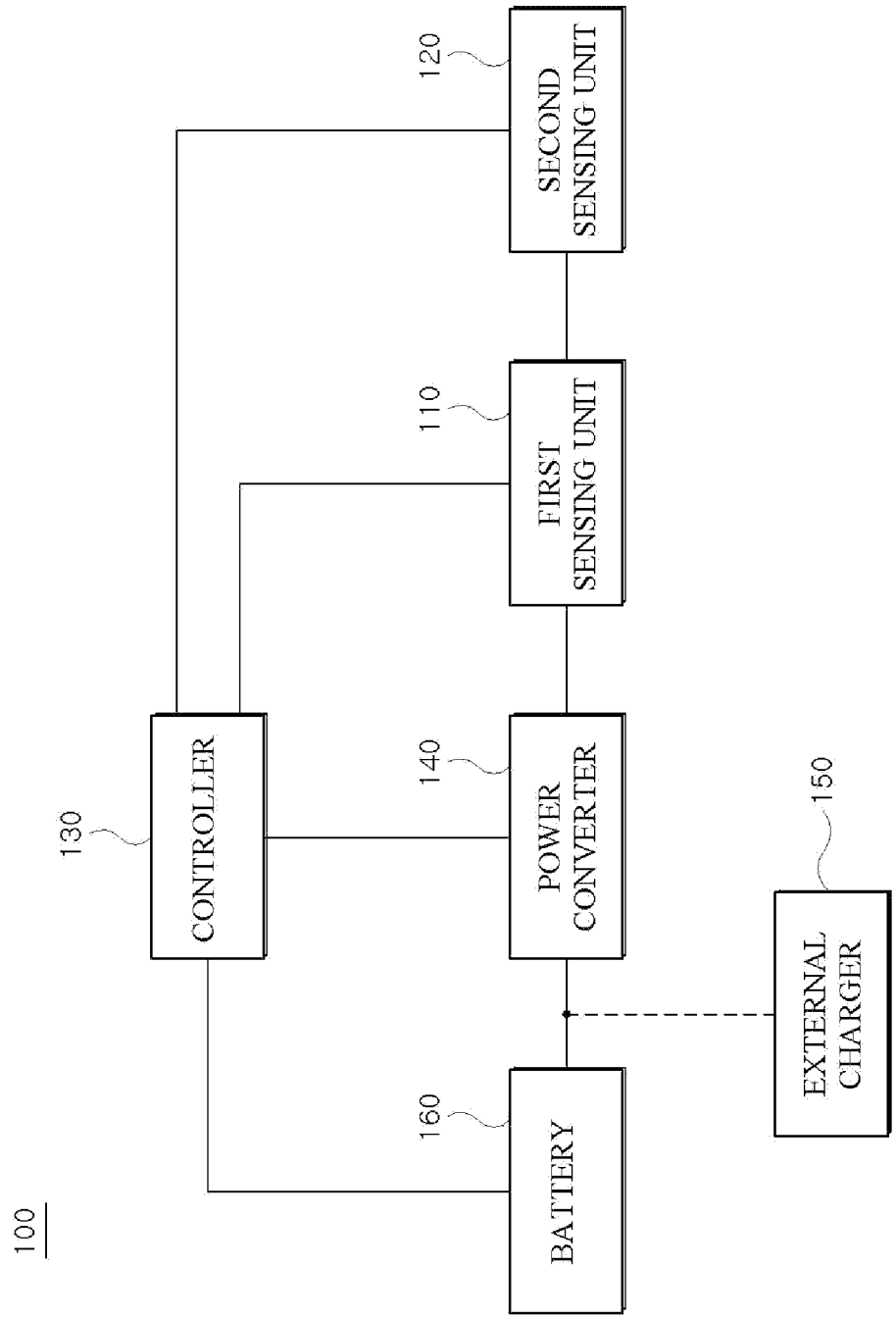
FIG. 1 is a block diagram illustrating a configuration of a multi-charging apparatus in one form of the present disclosure.

Various changes and various exemplary embodiments may be made in the present disclosure, such that specific exemplary embodiments are illustrated in the drawings and described in detail in the specification. It should be understood, however, that the exemplary embodiments are not intended to limit the present disclosure to the particular disclosed forms, but the present disclosure includes all modifications, equivalents, and alternatives falling within the sprit and technical scope of the present disclosure.

In describing each drawing, similar reference numerals are used for similar components. The terms "first," "second," and the like may be used to illustrate various components, but the components should not be limited by the terms. The terms are only used to differentiate one element from another.

For example, a first component may be referred to as a second component, and similarly, the second component may be also referred to as the first component without departing from the scope of the present disclosure. The terms "and/or" include a combination of a plurality of related listed items or any of a plurality of related listed items.

Unless defined otherwise, all terms including technical terms or scientific terms used herein have the same meaning as commonly understood by those skilled in the art to which the present disclosure pertains.

The terms defined in the dictionary commonly used should be interpreted as having a meaning consistent with the meaning in the context of the related technology, and should not be interpreted as an ideal or excessively formal meaning, unless clearly defined in the present application.

Hereinafter, a multi-charging apparatus and method according to an exemplary embodiment of the present disclosure will be described in detail with reference to the accompanying drawings.

FIG. 1 is a block diagram illustrating a configuration of a multi-charging apparatus 100 in some forms of the present disclosure. Referring to FIG. 1, the multi-charging apparatus 100 is characterized by including sensing units 110, 120, a controller 130, a power converter 140, an external charger 150, a battery 160, and the like.

The sensing units 110, 120 are composed of a first sensing unit 110 and a second sensing unit 120. The first sensing unit 110 serves to sense a power source input to the power converter 140, or to sense a power source output from the power converter 140 toward a motor (not shown). To this end, the first sensing unit 110 may be composed of a current sensor, a voltage sensor, and the like. Further, as the current sensor, a hall sensor, an optical fiber current sensor, a current transformer (CT) type current sensor, or the like may be used.

The second sensing unit 120 serves to sense the rotation of a motor. To this end, the second sensing unit 120 may be composed of a resolver, an encoder, and the like.

The controller 130 serves to determine failure of the first sensing unit 110, and to execute a charging operation control for the power converter 140 with reference to output values of the sensing units 110, 120, the output value of the battery, or the like when the failure occurs.

The power converter 140 serves to convert a low DC power source into a high DC power source. That is, the power converter 140 converts a 400 V DC power source supplied from the external charger 150 into an 800 V DC power source to supply the 800 V DC power source to the battery 160. In this case, the battery 160 may be charged by only the 800 V DC power source.

Of course, the power converter 140 also serves to convert the DC power source output from the battery 160 into the AC power source to supply the AC power source to a motor (not shown).

To this end, the power converter 140 is configured to include an inverter. Therefore, the power converter 140 may operate like a boost converter utilizing a motor-inverter structure. That is, the power converter 140 becomes a three-phase interleaved type boost converter. The boost converter serves to increase about 400 V to 800 V.

Generally, the multi-charging system is a system which helps to charge the 800 V-level battery 160 using the external charger 150 of about 400 V-level.

The external charger 150 serves to supply only the DC power source of 400 V. The external charger 150 may be electric vehicle supply equipment (EVSE) for a vehicle or the like.

The battery 160 is an 800 V-level exclusive battery. The battery 160 has battery cells configured in series and/or in parallel, and the battery cell may be a high-voltage battery for an electric vehicle such as a nickel metal battery, a lithium ion battery, or a lithium polymer battery. Generally, the high-voltage battery refers to a high-voltage of 100 V or more as a battery used as the power source moving the electric vehicle.

The battery cell may be designed as a cylindrical cell, a prismatic cell, a pouch-type cell, or the like. The pouch-type cells include a flexible cover composed of a thin film, and electrical components of the battery cell are disposed within the cover.

To implement the use of an optimal space within one battery cell, the pouch-type cells are particularly used. The pouch-type cells are also characterized by having a high capacity and a low weight. The edges of the aforementioned pouch-type cells include sealing joints (not illustrated). That is, the sealing joint connects two thin films of the battery cells, and the thin films include additional components within a cavity formed by the connection.

Generally, the pouch-type cells may also include electrolytic solution, like a lithium secondary battery or a nickel-hydrogen battery. The battery 160 may include a battery management system (BMS) which checks the state of the battery and manages the battery.

Figure 2:
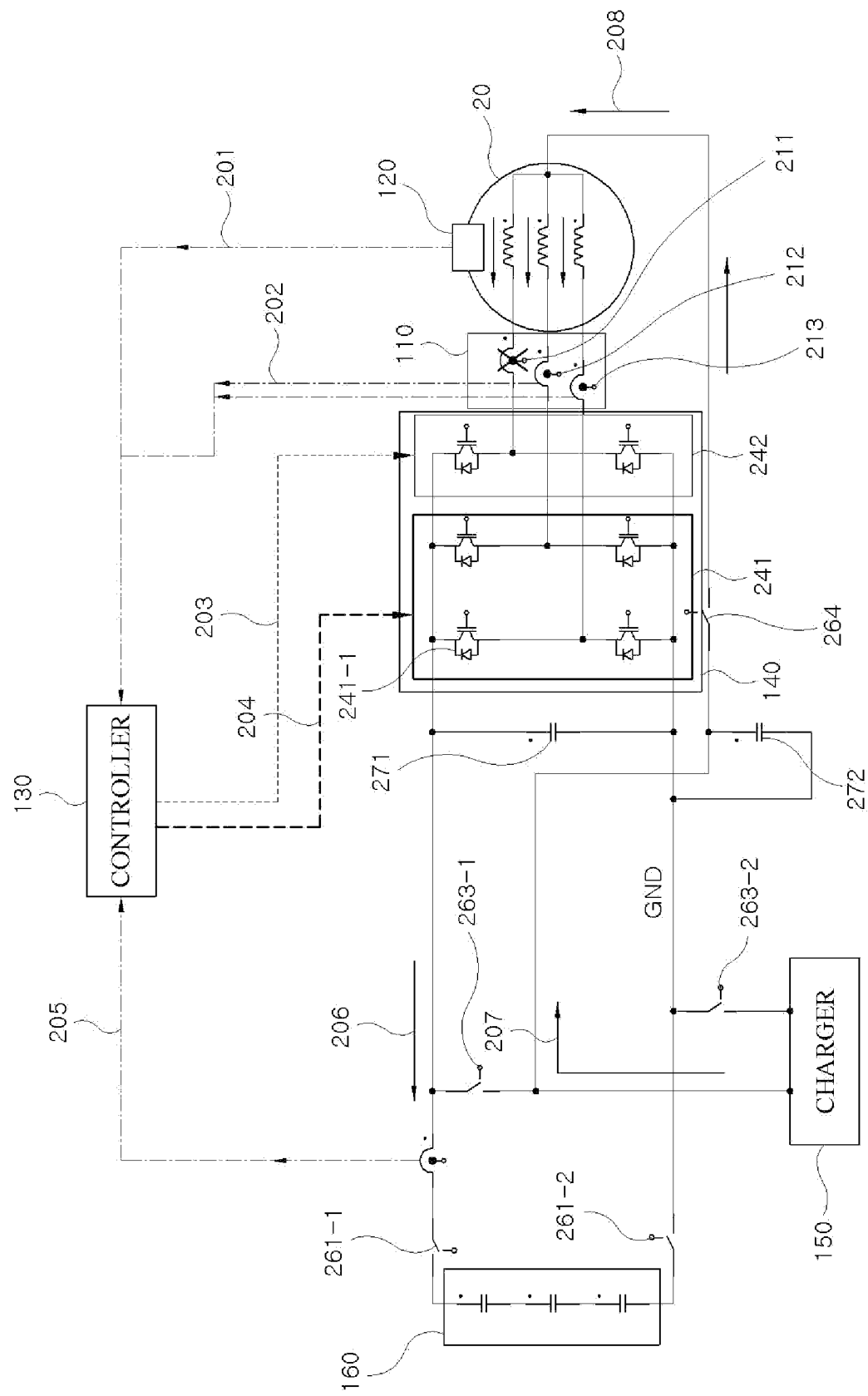
FIG. 2 is a block diagram illustrating a detailed configuration of the multi-charging apparatus illustrated in FIG. 1.

FIG. 2 is a block diagram illustrating a detailed configuration of the multi-charging apparatus 100 illustrated in FIG. 1. Referring to FIG. 2, a motor 20 uses a three-phase AC motor.

The first sensing unit 110 is configured between the motor 20 and the power converter 140. The first sensing unit 110 is composed of first to third sensors 211, 212, 213 to sense each of three phases. In FIG. 2, it is assumed that the first sensor 211 is in the failed state. Therefore, an output value of the first phase of three phases is zero, an output value of the second phase of three phases and an output value 202 of the third phase thereof are generated by the second sensor 212 and the third sensor 213, respectively.

The controller 130 determines whether the sensor is failed by using the output values 202 of the first to third phases generated by the first to third sensors 211, 212, 213. When it is determined that failure occurs, the controller 130 divides the power converter 140 into two portions to perform a second control 204, which is a normal control, for a normal portion 241 connected to a normal sensor. Unlike this, the controller 130 performs a first control 203, which performs a control with a basic value according to the correction, for a failed portion 242 connected to a failed sensor.

The power converter 140 has a pair of power switching elements 241-1 disposed for each phase and the first to third sensors 211, 212, 213 may be connected to the neutral point of the pair of power switching elements 241-1. As the power switching element 241-1, a semiconductor switching element such as a field effect transistor (FET), a metal oxide semiconductor FET (MOSFET), an insulated gate bipolar mode transistor (IGBT), or a power rectifier diode, a thyristor, a gate turn-off (GTO) thyristor, a triode for alternating current (TRIAC), a silicon controlled rectifier (SCR), an integrated circuit (I.C) circuit, or the like may be used. Particularly, in the case of the semiconductor element, a bipolar, a power metal oxide silicon field effect transistor (MOSFET) element or the like may be used. The power MOSFET element has a double-diffused metal oxide semiconductor (DMOS) structure unlike a general MOSFET due to the high-voltage and high-current operation.

The power converter 140 uses a pulse width modulation (PWM) inverter, which is a voltage type inverter, but is not limited thereto and may also use a current type inverter in a method of modifying some components. The PWM inverter simultaneously controls a voltage and a frequency for the rectified DC voltage using a pules width modulation (PWM) control method.

Further, the motor 20 is provided with a three-phase coil, and provided with the second sensing unit 120 in order to sense the rotation of the motor 20. Therefore, when the second sensing unit 120 senses the rotation of the motor 20, a sensing signal 201 is transferred to the controller 130. In this case, the controller 130 adjusts the motor to prevent the operation of the motor in order to prevent the rotation of the motor 20.

Switching elements 261-1, 261-2 are disposed on the front end of the battery 160 to serve to electrically conduct or cut off the power source output from the battery 160. Of course, the switching elements 261-1, 261-2 also serve to electrically conduct or cut off the power source input to the battery 160.

Further, switching elements 263-1, 263-2 are also disposed on the output end of the external charger 150 to serve to electrically conduct or cut off the power source output from the external charger 150. Of course, a switching element 264 may also be disposed between the motor 20 and the external charger 150 to cut off or electrically conduct the power source introduced into the motor 20.

As the switching elements 261-1, 261-2, 263-1, 263-2, 264, a power relay is used, but the present disclosure is not limited thereto, and a semiconductor switching element such as a field effect transistor (FET), a metal oxide semiconductor FET (MOSFET), an insulated gate bipolar mode transistor (IGBT), or a power rectifier diode, a thyristor, a gate turn-off (GTO) thyristor, a triode for alternating current (TRIAC), a silicon controlled rectifier (SCR), an integrated circuit (I.C) circuit, or the like may be used. Particularly, in the case of the semiconductor element, a bipolar, a power metal oxide silicon field effect transistor (MOSFET) element or the like may be used. The power MOSFET element has a double-diffused metal oxide semiconductor (DMOS) structure unlike a general MOSFET due to the high-voltage and high-current operation.

A first capacitor 271 is configured on the front end of the power converter 140 to constantly maintain the output power source in the power converter 140. Further, a second capacitor 272 is connected to the external charger 150 and a ground line such that the power source introduced into the motor 20 is constantly maintained.

Further referring to FIG. 2, an external charger output value 207 from the external charger 150 is used as an input value 208 of the motor 20 and a charging power source 206 is generated while passing through the power converter 140. The external charger output value 207 is about 400 V, and the charging power source 206 becomes about 800 V through the boost converter composed of the inductor component of the motor 20 and the power switching element 241-1 of the power converter 140.

Further, the controller 130 receives a battery output value 205 from the battery 160.

Figure 3:
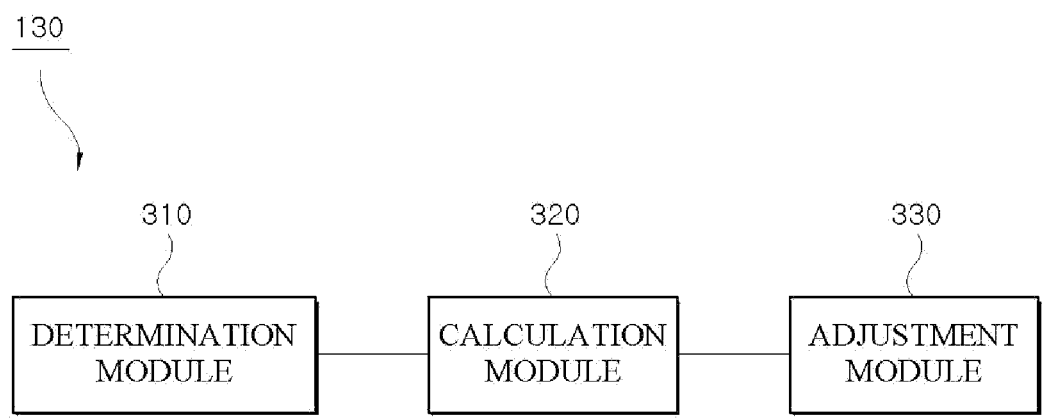
FIG. 3 is a block diagram illustrating a detailed configuration of a controller illustrated in FIG. 1.

FIG. 3 is a block diagram illustrating a detailed configuration of the controller 130 illustrated in FIG. 1. Referring to FIG. 3, the controller 130 may be configured to include a determination module 310, a calculation module 320, and an adjustment module 330, and the like.

The determination module 310 serves to determine whether the sensing unit 110 is failed by using the output value sensed by the sensing unit 110. The calculation module 320 calculates a control duty value (D) of the motor phase (i.e., corresponding phase) in which failure occurs. This is expressed by Equation 1 as follows.

$$D = \frac{V_{out} - V_{in}}{V_{out}} \quad \text{Equation 1}$$

where $V_{in}$ refers to an external charger power source value of the external charger 150, and $V_{out}$ refers to a battery power source value of the battery 160. For example, when $V_{in}$=400 V and $V_{out}$=800 V, D=0.5.

The adjustment module 330 controls the ON/OFF of the power switching elements 241-1 configured in the power converter 140 using the control duty value (D) calculated by the calculation module 320. That is, the adjustment module 330 performs a first control which performs a control with a default value calculated by designating some of the power converter 140 as the failure portion 242. Further, the adjustment module 330 performs a second control which performs a normal control by designating the remainder of the power converter 140 as the normal portion 241.

The determination module 310, the calculation module 320, and the adjustment module 330 illustrated in FIG. 3 mean units of processing at least one function or operation, and may be implemented by software and/or hardware. In the hardware implementation, the hardware may be implemented by an application specific integrated circuit (ASIC) designed for performing the aforementioned function, a digital signal processing (DSP), a programmable logic device (PLD), a field programmable gate array (FPGA), a processor, a microprocessor, other electronic units or a combination thereof. In the software implementation, the software may include a software configuration component (element), an object oriented software configuration component, a class configuration component, and a work configuration component, a process, a function, an attribute, a procedure, a sub routine, a segment of a program code, a driver, a firmware, a micro code, data, a database, a data structure, a table, an arrangement, and a variable. The software, data, and the like may be stored in a memory, and executed by the processor. The memory or the processor may employ various means well known to those skilled in the art.

FIG. 4 is a flowchart illustrating a multi-charging control process in some forms of the present disclosure. Referring to FIG. 4, first, when the external charger 150 is plugged-in the electric vehicle, the controller 130 determines whether the sensor is failed (steps S410, S420). The determination of the failure of the sensor may be confirmed by two cases as follows. For the understanding, the sensor is assumed as the current sensor.

① When a voltage value output from a current sensor is a predetermined value or more or a predetermined value or less ② When the ON/OFF relationship of the power switching element (241-1 in FIG. 2) and the change timing point of the value output from the current sensor do not coincide with each other.

In the case of the ②, when the power switching element 241-1 is turned on, it corresponds to a rising portion in an AC wave, and in this case, the output value is increased. Unlike the above, when the power switching element 241-1 is turned off, it corresponds to a falling portion in the AC wave and in this case, the output value is decreased. When the changes in the output values do not coincide with each other, the controller 130 determines that the sensor is failed.

Then, when the failure of the sensor is confirmed, the controller 130 executes the charging operation control for the occurrence of the failure. That is, the controller 130 calculates the default value for controlling the failed phase (steps S430, S440).

Then, the controller 130 controls the failed portion using the calculated default value, and controls the normal portion by the normal control (step S450). At this time, the charging starts.

Then, the controller 130 compares a current of the failed portion with a current of the normal portion again (step S460). That is, the current values of three phases should be basically equal to each other. Therefore, the following relationship is established.

Current of the failed phase (first sensor)=current of the battery−current of the second sensor−current of the third sensor If the respective current values of three phases are not equal to each other and have a difference therebetween, the duty should be controlled. That is, when the current value of the failed phase is larger than the current value of the second phase or the third phase, the control duty value (D) is decreased, and when the current value of the failed phase is smaller than the current value of the second phase or the third phase, the control duty value (D) is increased.

Basically, the balance of the force applied to the coil within the motor is not broken only when the current values of three phases are equal to each other. When the balance of the force is broken, the motor is rotated.

Even if the current values are equal to each other, the balance of the force may not be perfectly maintained by the influence of a magnet of a rotor (not shown) configured in the motor 20 and/or the error of the current sensor. The controller 130 receives the sensing signal sensing the rotation of the motor 20 to determine whether the motor 20 is operated (step S480). To this end, the case where the second sensing unit 120 is a resolver will be described, for example. When the motor is operated, the control duty value (D) is finely adjusted, thereby preventing the rotating operation of the motor (step S490).

That is, through the determination based on a resolver location value, when the resolver location value is larger than the current value, the control duty value is decreased, and when the resolver location value is smaller than the current value, the control duty value is increased. Here, the resolver location value is a value obtained by the movement of the resolver according to the rotation of the motor, and the current value is a value representing the location of the resolver before the charging starts. That is, the resolver is composed of a resolver stator (not illustrated) fixed to a stator (not illustrated) of the motor 20 and a resolver rotor (not illustrated) fixed to a rotor (not illustrated) to be rotated. Therefore, the resolver rotor is rotated as the rotor of the motor rotates.

Further, the steps of the method or the algorithm described with regard to the exemplary embodiments disclosed herein may be implemented in the program command format which may be performed by various computer means such as a microprocessor, a processor, and a central processing unit (CPU) and recorded in a computer readable medium. The computer readable medium may include a program (command) code, a data file, a data structure, and the like alone or in combination thereof.

The program (command) code recorded in the medium may be one specially designed and configured for the present disclosure or may also be one known to and used by those skilled in the computer software art. An example of the computer readable recording medium may include magnetic media such as a hard disk, a floppy disk, and a magnetic tape, optical media such as a CD-ROM, a DVD, and a Blue-ray, and semiconductor memory elements specially configured to store and perform the program (command) code, such as a ROM, a RAM, and a flash memory.

Here, an example of the program (command) code includes a high-level language code which may be executed by a computer using an interpreter or the like as well as a machine language code made by a complier. The hardware device may be configured to be operated as one or more software module to perform the operation of the present disclosure, and vice versa.

What is claimed is:

1. A multi-charging apparatus comprising:
a power converter configured to:
convert a first voltage power source introduced from a motor into a second voltage power source that is greater than the first voltage power source; and
supply the second voltage power source to a battery;
a first sensing unit provided on each of three phases of the motor, the first sensing unit configured to sense each power source for the first voltage power source; and
a controller configured to:
determine whether the first sensing unit is failed;
execute a charging operation control for the power converter to control a current value of a failed phase based on a current value of a normal phase of three phases when the first sensing unit is determined to be failed;
execute the charging operation control including a first control performing a control with a default value calculated based on the failed phase and a second control performing a normal control based on the normal phase; and
calculate the default value based on a control duty value of the failed phase,
wherein the first sensing unit is disposed between the motor and the power converter to sense each power source from the motor.

2. The multi-charging apparatus of claim 1, wherein the controller is configured to:
determine whether a failure occurs by comparing an output value of the first sensing unit with a preset reference value.

3. The multi-charging apparatus of claim 1, wherein the controller is configured to:
determine whether ON/OFF timing points of at least one power switching element disposed on the power converter coincide with a change timing point of the output value of the first sensing unit.

4. The multi-charging apparatus of claim 1, wherein the controller is configured to:
calculate the control duty value by dividing a difference value between a battery power source value and an external charger power source value by the battery power source value.

5. The multi-charging apparatus of claim 1, wherein the controller is configured to:
adjust the control duty value when the output value of the failed phase is not equal to the output value of the normal phase.

6. The multi-charging apparatus of claim 5, wherein the controller is configured to:
decrease the control duty value when the output value of the failed phase is greater than the output value of the normal phase; and
increase the control duty value when the output value of the failed phase is less than the output value of the normal phase.

7. The multi-charging apparatus of claim 1, wherein the controller is configured to:
adjust the control duty value based on whether the motor is rotated by a second sensing unit when the output value of the failed phase is equal to the output value of the normal phase.

8. The multi-charging apparatus of claim 7, wherein the controller is configured to:
decrease the control duty value when a location value of the second sensing unit, which is moved as the motor rotates, is greater than a current value at which the second sensing unit is located before charging starts; and
increase the control duty value when the location value of the second sensing unit is less than the current value, in order to prevent the rotation of the motor.

9. A multi-charging method comprising:
sensing, by a first sensing unit provided on each of three phases of a motor, each power source for a first voltage introduced from the motor;
determining, by a controller, whether failure occurs in the first sensing unit;
executing, by the controller, a charging operation control controlling a current value of a failed phase based on a current value of a normal phase of three phases when the failure is determined to occur; and
charging, by a power converter that is configured to convert a first voltage power source into a second voltage power source that is greater than the first voltage power source to supply the second voltage power source to a battery,
wherein the first sensing unit is disposed between the motor and the power converter to sense each power source from the motor, and
wherein executing the charging operation control comprises:
performing a first control with a default value calculated based on the failed phase, wherein performing the first control comprises calculating the default value based on a control duty value of the failed phase; and
performing a second control that is a normal control based on the normal phase.

10. The multi-charging method of claim 9, wherein determining whether the failure occurs comprises:
comparing an output value of the first sensing unit with a preset reference value.

11. The multi-charging method of claim 9, wherein determining whether the failure occurs comprises:
determining whether ON/OFF timing points of at least one power switching element disposed on the power converter coincide with a change timing point of an output value of the first sensing unit.

12. The multi-charging method of claim 9, wherein calculating the default value comprises:
calculating the control duty value by dividing a difference value between a battery power source value and an external charger power source value by the battery power source value.

13. The multi-charging method of claim 9, further comprising:
adjusting the control duty value when the output value of the failed phase is not equal to the output value of the normal phase.

14. The multi-charging method of claim 13, wherein adjusting the control duty value comprises:
decreasing the control duty value when the output value of the failed phase is greater than the output value of the remaining normal phase; and
increasing the control duty value when the output value of a first phase is less than the output value of the sum of a second phase and a third phase.

15. The multi-charging method of claim 9, further comprising:
  adjusting the control duty value based on whether the motor is rotated by a second sensing unit when the output value of the failed phase is equal to the output value of the normal phase.

16. The multi-charging method of claim 15, wherein adjusting the control duty value comprises:
  decreasing the control duty value when a location value of the second sensing unit, which is moved as the motor rotates, is greater than a current value at which the second sensing unit is located before charging starts, and
  increasing the control duty value when the location value of the second sensing unit is less than the current value, in order to prevent the rotation of the motor.

* * * * *